US012743303B2

(12) United States Patent
Wang et al.

(10) Patent No.: US 12,743,303 B2
(45) Date of Patent: Sep. 22, 2026

(54) PSEUDORANDOM THREAD GENERATION

(71) Applicant: Huawei Technologies Co., Ltd., Shenzhen (CN)

(72) Inventors: Jingliang Wang, Austin, TX (US); Noah Sherrill, Austin, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 653 days.

(21) Appl. No.: 18/061,224

(22) Filed: Dec. 2, 2022

(65) Prior Publication Data

US 2023/0097765 A1 Mar. 30, 2023

Related U.S. Application Data

(63) Continuation of application No. PCT/US2021/035492, filed on Jun. 2, 2021.

(60) Provisional application No. 63/034,789, filed on Jun. 4, 2020.

(51) Int. Cl.
*G06F 9/48* (2006.01)
*G06F 7/58* (2006.01)

(52) U.S. Cl.
CPC ............ *G06F 9/4881* (2013.01); *G06F 7/582* (2013.01)

(58) Field of Classification Search
CPC ............................... G06F 9/4881; G06F 7/582
See application file for complete search history.

(56) References Cited

U.S. PATENT DOCUMENTS

| | | | | |
|---|---|---|---|---|
| 5,574,912 | A * | 11/1996 | Hu | G06F 21/556 707/999.001 |
| 7,565,651 | B1 * | 7/2009 | Carey | G06F 9/505 718/107 |
| 2012/0303691 | A1 | 11/2012 | Muff et al. | |
| 2014/0149990 | A1 | 5/2014 | El-Moursy et al. | |
| 2019/0179543 | A1 * | 6/2019 | Sharon | G11C 16/3427 |
| 2019/0196874 | A1 * | 6/2019 | Nagaswamy | G06F 9/4881 |
| 2020/0012537 | A1 * | 1/2020 | Lacey | H04L 65/104 |
| 2021/0294660 | A1 * | 9/2021 | Uralsky | G06F 9/52 |
| 2021/0409207 | A1 * | 12/2021 | Prokop | H04L 9/0825 |
| 2024/0061747 | A1 * | 2/2024 | Patodia | G06F 9/4881 |

* cited by examiner

*Primary Examiner* — Peng Ke
(74) *Attorney, Agent, or Firm* — Slater Matsil, LLP

(57) ABSTRACT

Implementations are directed to methods, systems, and computer-readable media for scheduling threads for instruction sequence generation. In one aspect, scheduling threads for instruction sequence generation can include obtaining a model of a central processing unit (CPU) that includes a plurality of threads, wherein the model includes a plurality of model threads that correspond to the plurality of threads of the CPU. A seed value can be input into a pseudorandom number generator and in response to the input seed value, a sequence of pseudorandom values can be obtained from the pseudorandom number generator. Using the sequence of pseudorandom values and a thread scheduling algorithm, a thread execution order of the plurality of model can be generated.

21 Claims, 5 Drawing Sheets

Front-End
162

Back-End
164

Thread Scheduler
166

Thread Dispatcher
168

Scheduling Strategy
170

Request Operation
212

Create Thread Context Object
214

Request Permission to Advance
216

Determine model thread from requesting software execution thread
218

Get Currently Scheduled Thread
220

Return Currently Scheduled Thread
222

No

Requesting Thread Scheduled?
224

Get Resources For Requesting Thread
226

Execute Operation
228

Notify Operation Complete
230

Request Scheduling of Next Thread
232

Advance Scheduling Strategy
234

Return Results
236

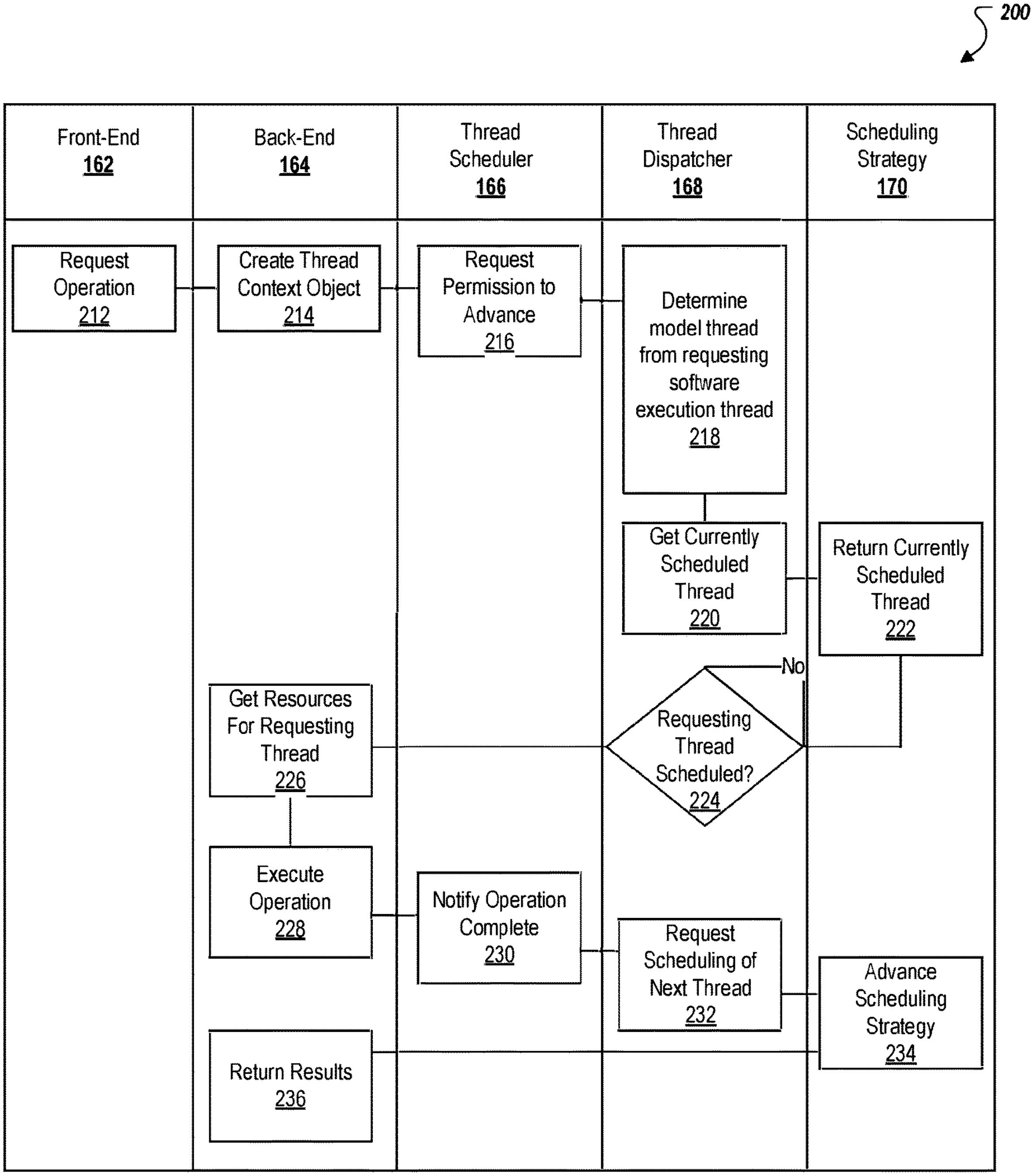

FIG. 2

PSEUDORANDOM THREAD GENERATION

CROSS-REFERENCE TO RELATED APPLICATIONS

This application is a continuation of Application No. PCT/US2021/035492, filed on Jun. 2, 2021, which claims the benefit of U.S. Application Ser. No. 63/034,789, filed on Jun. 4, 2020, applications of which are incorporated herein by reference in their entireties.

TECHNICAL FIELD

The present disclosure generally relates to instruction sequence generation during central processing unit (CPU) design verification and, more particularly, to pseudorandom thread generation.

BACKGROUND

Pre-silicon verification of a CPU design is used to test the states and functional correctness of the design, which is modeled typically in a hardware design language, such as VHDL, or Verilog. Verification of the complete design of complex microprocessors and system on chips (SoCs) can be resource intensive, requiring large amounts of memory, and processing power, due to the large number of states and functions in the CPU design space. An instruction sequence generator (ISG) can be used in testing of a CPU design, e.g., by generating test sequences of instructions for simulation during testing of the CPU design. By simulating different sequences of instructions, errors and bugs with the CPU design can be identified and the different functions of the CPU design in all its possible states can be tested.

SUMMARY

Multiprocessing is a standard feature of a high-performance CPU, which requires significant investment in verification of the CPU's design. For an instruction sequence generator (ISG) to be used in verifying a multiprocessing CPU design, the ISG should be able to model distinct threads of execution of the CPU and generate instructions for each of those threads. Reproducibility of the instruction sequences and resulting execution paths is advantageous both in single processing and multiprocessing contexts for verification and error correction. In a multiprocessing context, reproducibility is more difficult because thread execution order is typically non-deterministic. Due to the randomness of the instruction sequence generation, each sequence of threads that is generated during verification of the CPU design is different from the previous one. If a given test instruction sequence generates a bug or an error, it can be challenging to isolate the error and reproduce the test instruction sequence. Being able to reproduce the same instruction test sequence enables the bug or error to be rapidly isolated. Furthermore, once the proposed CPU design has been altered to address the bug, the design can be verified using the same test instruction sequence after the alteration to ensure the bug or error no longer appears.

This specification involves systems, software, and computer-implemented methods for reproducible instruction verification in multithreaded CPU design. In one aspect, a method can include obtaining a model of a central processing unit (CPU) that includes a plurality of threads, wherein the model includes a plurality of model threads that correspond to the plurality of threads of the CPU, inputting, into a pseudorandom number generator, a seed value, obtaining, from the pseudorandom number generator and in response to the input seed value, a sequence of pseudorandom values, and generating, using the sequence of pseudorandom values and a thread scheduling algorithm, a thread execution order of the plurality of model threads.

Other implementations of this aspect include corresponding systems, apparatus, and computer programs, configured to perform the actions of the methods, encoded on computer storage devices. These and other embodiments can each optionally include one or more of the following features.

In some implementations, the methods can further include determining when a currently executing model thread of the plurality of model threads will finish executing and a next model thread will begin executing, and advancing to the next model thread when the currently executing model thread finishes executing.

In some implementations, obtaining the model includes tracking state information for each of the plurality of model threads.

In some implementation, the methods can further include spawning a separate software execution thread for each of the one or more model threads, and maintaining a mapping of software execution threads to each of the one or more model threads using a map data structure.

In some implementations the methods can further include obtaining a list of thread identifiers (IDs) of the plurality of software execution threads.

In some implementations, the methods can further include obtaining a thread ID of the software execution thread currently executing and, obtaining, using the thread ID of the software execution thread and the mapping, the model thread corresponding to the software execution thread.

In some implementations, the methods can further include retrieving a state and resources assigned to model thread for executing a model thread in response to a scheduled model thread operation.

In some implementations, the methods can further include requesting for the software execution thread currently executing to continue execution, retrieving, from the map data structure, the model thread corresponding to the software execution thread currently executing, determining whether the model thread is a currently scheduled thread, and, controlling execution of the model thread based on whether the model thread is the currently scheduled thread.

In some implementations, the methods can further include selecting the instruction scheduling algorithm from among a plurality of instruction scheduling algorithms, wherein the plurality of instruction scheduling algorithms include at least a shuffled round-robin algorithm, a weighted random selection algorithm, a random starvation scheduling algorithm, and a priority scheduling algorithm.

In some implementations, the methods can further include selecting the seed value from among a plurality of seed values, wherein the plurality of seed values include the data, the time, and a user-specified seed value.

The present disclosure also provides non-transitory computer-readable media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a non-transitory computer-readable media device coupled to the one or more processors having instructions stored thereon which, when executed by the one or more processors, cause the one or more processors to perform operations in accordance with implementations of the methods provided herein.

The subject matter described in this specification can be implemented in particular embodiments to realize one or more of the following advantages. For example, the efficient pseudorandom thread scheduling framework described in this specification enhances the capabilities of an ISG by enabling consistent reproduction of a thread execution sequence, which in some implementations, can be accomplished by specifying a seed value for the pseudorandom number generator. By specifying a seed value for the pseudorandom number generator used to generate a sequence of pseudorandom numbers and using that sequence in generating a test sequence of instructions, the generated sequence of instructions becomes reproducible, e.g., when the same seed value is input, the same sequence of pseudorandom numbers is output and by extension, the same sequence of instructions is obtained. This means that when an error is detected, it is possible to repeat the sequence of generated instructions by inputting the same seed into the pseudorandom number generator.

Furthermore, the scheduling algorithm is interchangeable, allowing testing of different thread scheduling scenarios. CPU verification attempts to test all processor functions, states, and state transitions. Using one scheduling algorithm may simulate some functions and states of a CPU design, whereas using a different scheduling algorithm may simulate other functions and states of the CPU design. The ability to switch between different scheduling algorithms increases efficiency by enabling a verification engineer to generate test cases that more comprehensively test more functions and states of the CPU design.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a swim-lane diagram of an example process implemented in an instruction sequence generator.

Like reference numbers and designations in the various drawings indicate like elements.

DETAILED DESCRIPTION OF ILLUSTRATIVE EMBODIMENTS

Figure 1:
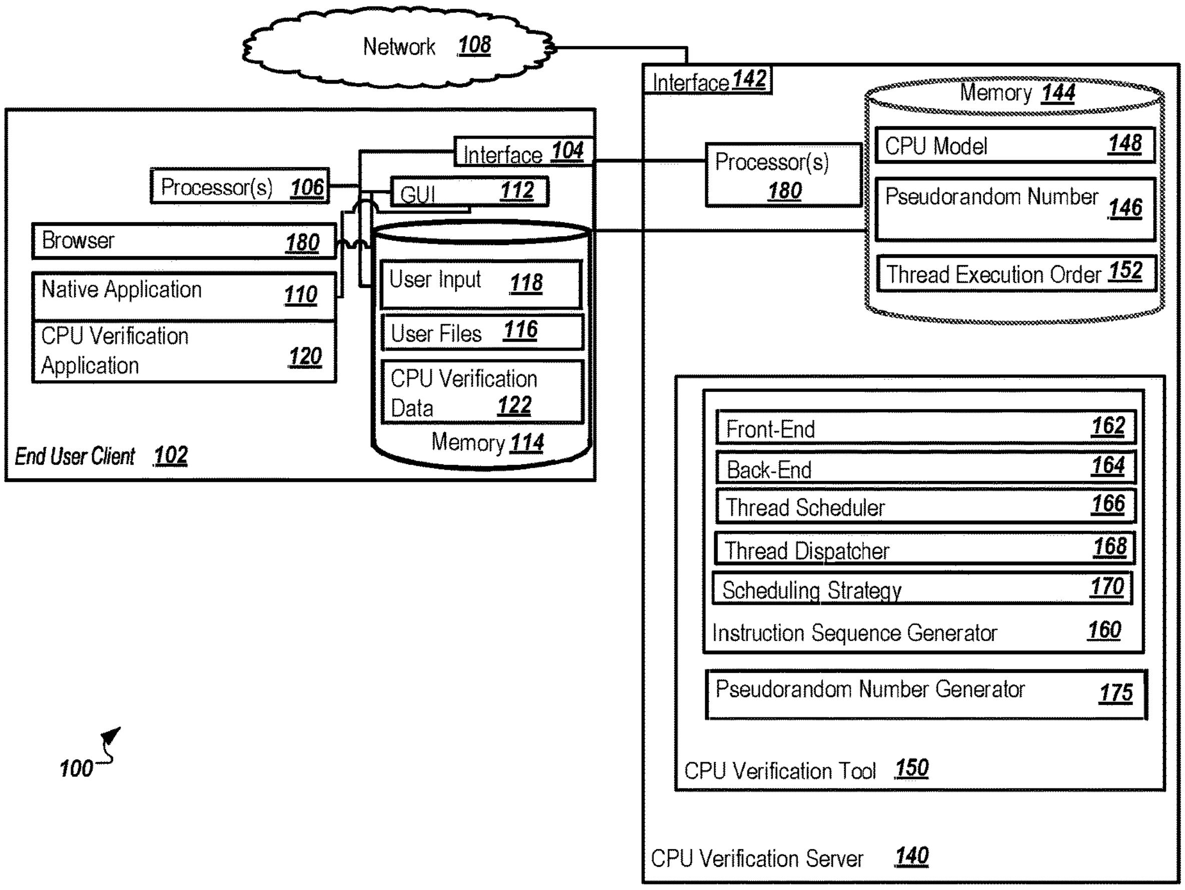
FIG. 1 is a block diagram illustrating an example system for CPU verification.

FIG. 1 is a block diagram illustrating an example system for CPU verification. Specifically, the illustrated system 100 includes or is communicably coupled with a CPU verification server 140, an end-user client device 102, and a network 108 (which can include a local area network (LAN), a wide area network (WAN), the Internet, or a combination thereof). Although shown separately, in some implementations, functionality of two or more systems, devices, or servers (e.g., the end user client device 102 and the CPU verification server 140) may be provided by a single system or server. In some implementations, the functionality of one illustrated system, server, or engine may be provided by multiple systems, servers, or engines, respectively.

An end-user client device 102 (also referred to herein as client device 102 or device 102) is an electronic device that is capable of requesting and receiving content over the network 108. The end-user client device 102 can include any client computing device such as a laptop/notebook computer, wireless data port, smart phone, personal data assistant (PDA), tablet computing device, one or more processors within these devices, or any other suitable processing device that can send and receive data over the network 108. For example, the end-user client device 102 can include, e.g., a computer that includes an input device, such as a keypad, touch screen, or other device that can accept user information, and an output device that conveys information, e.g., associated with the operation of the CPU verification 140, or the client device itself, including digital data, visual information, or the GUI 112.

The end-user client device 102 typically includes one or more applications, such as a browser 170 or a native application 110, to facilitate sending and receiving of content over the network 108. Examples of content presented at a client device 102 include compilers, interpreters, source code editors, integrated development environments (IDEs), webpages, word processing documents, portable document format (PDF) documents, images, and videos.

Figure 3:
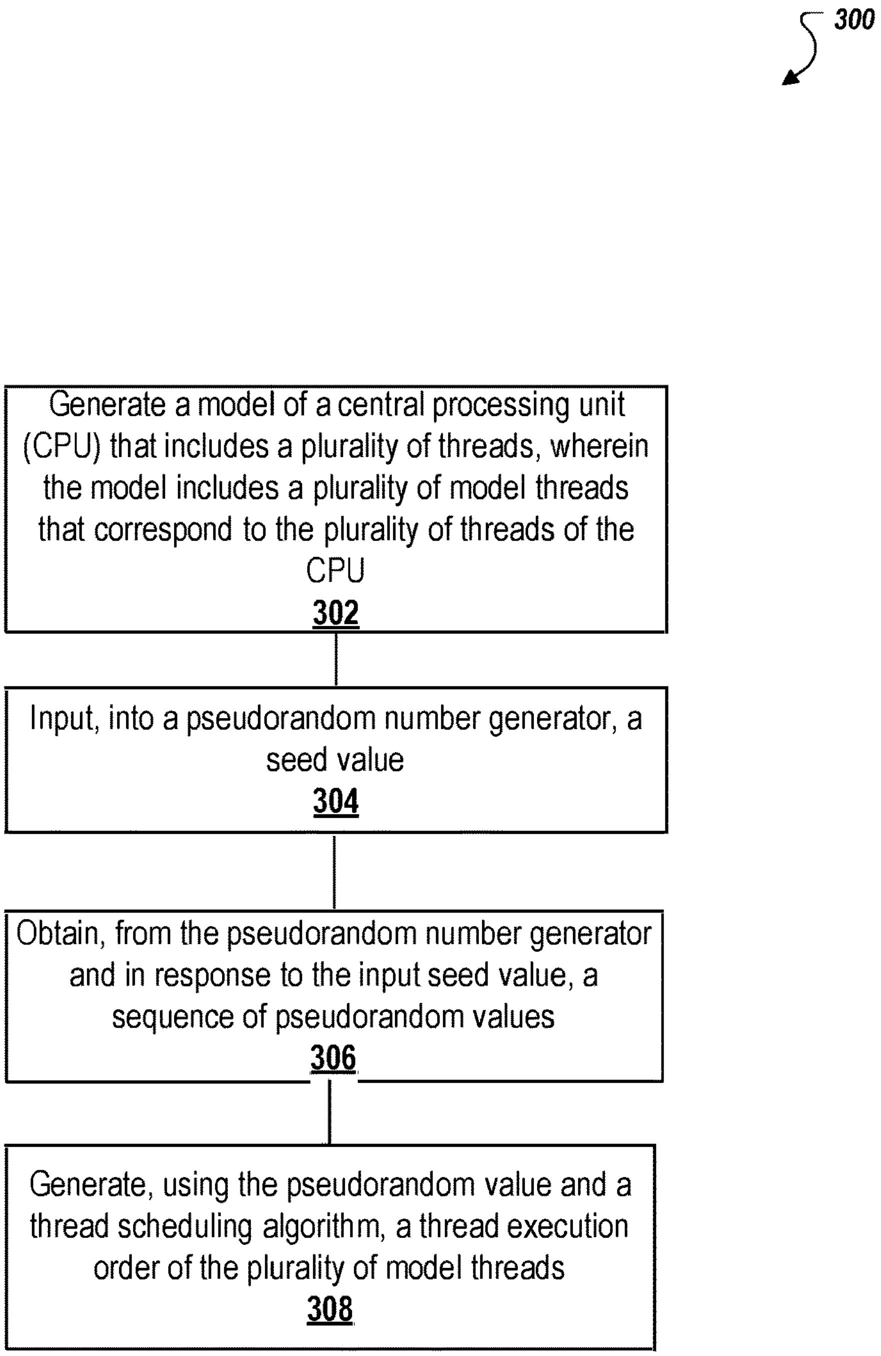
FIG. 3 is a flow diagram of an example process of pseudorandom thread generation.

As described further with reference to FIGS. 2-3, an end user of the end-user client device 102 may desire to use CPU verification tool 150 located at CPU verification server 140 to carry out one or more tasks associated with a verification of a CPU design, for example, instruction sequence generation. To do that, the end user of the client device 102 can launch a CPU verification application on the client device 102 that interfaces with and accesses the CPU verification tool 150 located at the CPU verification server 140. The end user client device 102 provides the CPU verification application 120 for display within graphical user interface (GUI) 112.

Within the CPU verification application 120, the end user can input user input 118. The user input may specify one or more aspects of a CPU model 148, e.g., a software model of a CPU coded in Verilog or other hardware description language. The user input may also specify a pseudorandom number seed (as further described below). Once the end user enters and submits the user input 118, the CPU verification tool 150 of the CPU verification server 140 receives this data. CPU verification tool 150 can be used to find design bugs in a relatively stable but not yet mature CPU designs, for example a CPU design implemented in Verilog, or HDL,. The CPU verification tool 150 processes the user input 118 to determine one or more aspects of the CPU model, for example, a thread execution order 152 (as further described below with reference to FIGS. 2-3), and provides this data (also referred to as CPU verification data) to the CPU verification application executing on the client device 102. For example, the CPU verification data may be a generated thread execution order used to test a CPU model for bugs and corner cases that may cause errors or other issues when the CPU model is implemented in hardware. That is, the output of the CPU verification tool 150 can be a binary encoding of instructions and data to be loaded in the memory in the simulation of the CPU design. The thread execution order determined by the CPU verification tool influences the instructions and data contained in the binary encoding. The encoded instructions and data do not impose an execution order on the CPU model itself, however, the sequence order is reproducible as described herein.

In some implementations, the end user of the client device 102 can store the received CPU verification data 122 in the client device 102's memory 114 (along with the other user files 116 that may already be stored in the memory 114).

In more detail, CPU verification tool 150 at the CPU verification server 140 may receive user input 118 and use the user input 118 to execute one or more CPU verification operations, as performed by the software components of the CPU verification tool 150. For example, CPU verification tool 150 includes at least two software components: an Instruction Sequence Generator (ISG) 160 and a Pseudorandom Number Generator 175.

The ISG 160 is used for processor design verification and validation. For example, the ISG 160 can be used to explore the design space of thread-execution order of the CPU. The pseudorandom number generator 175 generates a pseudorandom number based on an input seed value, as specified in the user input (and as further described below). In an example, user-input may include a pseudorandom number input seed for input into pseudorandom number generator 175.

As depicted in FIG. 1, in some implementations, the ISG 160 includes at least the following software components: front-end 162, back-end 164, thread scheduler 166, thread dispatcher 168, and scheduling strategy 170. Each of these software components is summarized below and described in additional detail with reference to FIGS. 2 and 3.

User input may be received at a front-end software component 162 of the ISG 160. The front-end 162 is linked to a back-end software component 164 of the ISG 160. In an example, a front-end 162 can be a Python layer presented via an interactive development environment (IDE) at GUI 112 that is linked to a C++ back-end 164. In an implementation, the GUI 112 may be linked to the C++ back-end 164 utilizing a framework called pybind or another appropriate framework (e.g., Boost Python Library, SWIG, etc.). Pybind allows a thread context (as described below) to be implemented by the user without having to explicitly construct it. The thread context is a software object that ensures that appropriate execution control calls are made. For example, the thread context determines and instructs release of any locks held by a thread are released upon determining that execution of a task has terminated due to an exception. Calls within Pybind generate thread contexts. In another example, the thread context may be explicitly constructed by invocation of a C++ constructor in the ISG back-end 164.

A thread context can be created by the user via front-end 162 issued to invoke the thread-scheduler 166. For example, the thread context may be a context manager invoked in Python to allocate and release resources for the thread.

The thread scheduler 166 is a software object that determines which threads to execute and when to switch between thread contexts based on the thread scheduling strategy. This helps to provide reproducibility and can be fault tolerant. In other words, the thread scheduler 166 determines a thread execution order. The thread scheduler 166 allows for switching to different scheduling strategies 170 without requiring any modification to the thread scheduler 166 itself. A sequence of pseudorandom numbers generated by pseudorandom number generator 175 (e.g., using a seed that is provided to the pseudorandom number generator 175) can be used by the thread scheduler 166, together with the one or more scheduling strategies 170, to generate a sequence of threads in a thread execution order 152. As described previously, using the same seed that results in generation of the same sequence of pseudorandom numbers enables consistent generation of a same sequence of threads in each iteration of the design verification.

Thread dispatcher 168 is a software object that coordinates with the thread scheduler 166 to execute a currently scheduled thread and advance to the thread to be executed next (e.g., according to the thread execution order determined by the thread scheduler 166). In an implementation, the thread context notifies the thread dispatcher 168 that a thread is requesting permission to execute when the thread context is entered. The thread dispatcher 168 queries the thread scheduler 166 to determine the currently active thread. The thread dispatcher 168 then pauses or halts the thread's execution until it becomes the currently active thread. The thread is not paused or halted in the case where it already is the currently active thread.

When the thread terminates its operation, whether because it is completed or due to an error, the thread context is exited. Exiting the thread context triggers a call to notify the thread dispatcher 168 that the currently executing thread has finished execution. That is, the thread dispatcher 168 determines when a currently executing model thread of the plurality of model threads will finish executing and a next model thread will begin executing The thread dispatcher 168 in turn notifies the thread scheduler 166 to advance to the next thread.

In an implementation, the ISG 160 schedules threads without the user needing to be actively aware of such thread scheduling. The ISG 160 generates a stream of instructions for a CPU model. The CPU model has one or more threads in which to execute the instructions issued to it. The ISG 160 models these threads by tracking various state information for each of them, these threads are described herein as generator model threads (also simply referred to as model threads). When any software application executes (e.g., the ISG 160), it has one or more threads of execution in which to execute its instructions. These are referred to as software execution threads.

In an implementation, the ISG 160 spawns a separate software execution thread for each of the CPU model threads it is modeling, so each CPU model thread's instructions are generated within a separate software execution thread of the ISG application. The thread scheduler 166 constructs a one-to-one mapping between software execution threads and model threads. The mapping between the two is stored in the ISG memory using a map data structure and the mapping is maintained/managed by the thread dispatcher. The ISG can query the operating system for the ID of the software execution thread currently executing. It can then use that ID of the software execution thread to look up the ID of the model thread that corresponds to it in the map data structure.

On an incoming request to the back-end 164, the thread scheduler 166 identifies the current software execution thread and maps it to the generator model thread. It then retrieves the necessary state and resources assigned to that generator model thread for executing the request, e.g., by the thread context 162. All of this can happen without any intervention from the user.

In an implementation, the thread scheduler 166 constrains the execution of model threads such that only one model thread is permitted to execute at a time. The sequence in which the model threads execute is determined by scheduling strategy 170, which can be configurable. For example, scheduling strategy 170 can be implemented using different scheduling algorithms. The thread scheduling strategy 170 relies on pseudorandom number generator 175 in order to vary its behavior, e.g., by generating a thread execution order based on the scheduling strategy 170 and the sequence of pseudorandom numbers. In an example, a user can provide, as user input, a seed value to the pseudorandom number generator to provide a mechanism so that the thread execution order issued by the scheduling strategy 170 will be consistent from one run to the next (as further described with reference to FIGS. 2 and 3). That is, if the same seed is used, the same sequence of numbers will be generated each time. The sequence of numbers are used to generate a thread execution order based on the thread scheduling strategy (e.g. shuffled round robin or other strategy).

Interfaces 104 and 142 are used by the end-user client device 102 and the CPU verification server 140, respectively, for communicating with other systems in a distributed environment—including within the system 100 connected to the network 108. Generally, each of the interfaces 104 and 142 include logic encoded in software and/or hardware in a suitable combination and operable to communicate with the network 108. More specifically, these interfaces can each include software supporting one or more communication protocols associated with communications such that the network 108 or interface's hardware is operable to communicate physical signals within and outside of the illustrated system 100.

The CPU verification server 140 includes one or more processors 180. Each processor 180 may be a central processing unit (CPU), a blade, an application specific integrated circuit (ASIC), a field-programmable gate array (FPGA), or another suitable component. Generally, each processor 180 executes instructions and manipulates data to perform the operations of the CPU verification server 140. Specifically, each processor 180 executes the functionality required to receive and respond to requests from the end-user client device 102, for example.

The CPU verification server 140 includes memory 144. In some implementations, the CPU verification server 140 includes multiple memories. The memory 144 may include any type of memory or database module and may take the form of volatile and/or non-volatile memory including, without limitation, magnetic media, optical media, random access memory (RAM), read-only memory (ROM), removable media, or any other suitable local or remote memory component. The memory 144 may store various objects or data, including video files, metadata, caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the CPU verification server 140.

In general, the end-user client device 102 is an electronic computer device operable to receive, transmit, process, and store any appropriate data associated with the system 100 of FIG. 1. The end-user client device 102 can include one or more client applications (as described above). A client application is any type of application that allows the end-user client device 102 to request and view content on a respective client device. In some implementations, a client application can use parameters, metadata, and other information received at launch to access a particular set of data from the CPU verification server 140. In some instances, a client application may be an agent or client-side version of the one or more applications running on the CPU Verification Server 140 or another server (not shown).

The client device 102 include one or more processor(s) 106. The processor 106 can be a central processing unit (CPU), an application specific integrated circuit (ASIC), a field-programmable gate array (FPGA), or another suitable component. Generally, processor 106 included in the end-user client device 102 executes instructions and manipulates data to perform the operations of the end-user client device 102. Specifically, processor 106 included in the end-user client device 102 executes the functionality, e.g., for sending requests, to the CPU verification server 140 and to receive and process responses from the CPU verification server 140.

GUI 112 interfaces with at least a portion of the system 100 for any suitable purpose, including generating and/or displaying a visual representation (or data that provides a visual representation) provided by the CPU verification server 140. Generally, the GUI 112 provides a user with an efficient and user-friendly presentation of data provided by or communicated within the system 100. The GUI 112 may have a plurality of customizable frames or views having interactive fields, pull-down lists, and buttons operated by the user. The GUI 112 contemplates any suitable graphical user interface, such as a combination of a generic web browser, intelligent engine, and command line interface (CLI) that processes information and efficiently presents the results to the user visually.

Memory 114 included in the end-user client device 102 may include any memory or database module and may take the form of volatile or non-volatile memory including, without limitation, magnetic media, optical media, random access memory (RAM), read-only memory (ROM), removable media, or any other suitable local or remote memory component. The memory 114 may each store various objects or data, including video files, metadata, data structures, user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device.

There may be any number of end-user client devices 102 associated with, or external to, the system 100. For example, while the illustrated system 100 includes one end-user client device 102, alternative implementations of the system 100 may include multiple end-user client devices 102 communicably coupled to the CPU verification server 140 and/or the network 108, or any other number suitable to the purposes of the system 100. Additionally, there may also be one or more additional end-user client devices 102 external to the illustrated portion of system 100 that are capable of interacting with the system 100 via the network 108. Further, the term "client," "client device," and "user" may be used interchangeably as appropriate without departing from the scope of this disclosure. Moreover, while the end-user client device 102 may be described in terms of being used by a single user, this specification contemplates that many users may use one computer, or that one user may use multiple computers.

FIG. 2 is a swim-lane diagram of an example process 200 implemented in an instruction sequence generator. Operations of process 200 are described below as being performed by the components of the system described and depicted in FIG. 1. Operations of the process 200 are described below for illustration purposes only. Operations of the process 200 can be performed by any appropriate device or system, e.g., any appropriate data processing apparatus. Operations of the process 200 can also be implemented as instructions stored on a non-transitory computer readable medium. Execution of the instructions causes one or more data processing apparatus to perform operations of the process 200.

As described above with reference to FIG. 1 an ISG includes front-end 162, back-end 164, thread scheduler 166, thread dispatcher 168, and scheduling strategy 170.

A user requests 212 a thread scheduling operation to be executed via the front end 162. In an implementation, the pybind framework described with reference to FIG. 1 links a front-end 162 Python layer with a C++ back-end 164. Pybind is a lightweight framework that exposes C++ types in Python and vice versa, to create Python bindings of existing C++ code to minimize boilerplate code in traditional extension modules by inferring type information using compile-time introspection.

Back-end 164 creates 214 the thread context object in response to the user requesting the thread scheduling operation. In an example, the pybind call_guard function allows a thread context object to be declared without having to explicitly construct it in all instances. The function call_guard constructs the thread context object. However, in another implementation, the thread context object can be explicitly constructed, e.g., by invocation of a C++ constructor in the ISG back-end 164. As described with reference to FIG. 1 the thread scheduler 16 constructs a one-to-one mapping between software execution threads and model threads. The mapping between the two is maintained in the ISG application's memory using a map data structure.

The thread dispatcher 168 notifies the thread scheduler 166 to advance to the next software execution thread 216 from the currently executing software execution thread. The thread dispatcher 168 obtains a list of thread identifiers (IDs) of the software execution threads by querying the operating system for the IDs of the software executions thread currently executing. The thread dispatcher 168 identifies the currently scheduled model thread by determining 218, using the thread ID of the software execution thread and the mapping, the model thread corresponding to the currently executing software execution thread.

A software execution thread can request execution. The thread dispatcher 208 maps this software execution thread to the model thread and determines if that model thread is the currently scheduled thread (e.g., as described in the previous paragraph). If the model thread is not the currently scheduled thread, the thread dispatcher 208 will periodically check for an update to the currently scheduled thread until it determines that the model thread corresponding to the requesting software execution thread is the currently scheduled thread. At that point, the requesting thread is permitted, by the thread dispatcher, to proceed with its operation.

If the model thread is scheduled 224, the thread dispatcher 168 requests that the back-end 164 retrieve 226 a state and resources assigned to model thread for executing a model thread in response to a scheduled model thread operation.

If the requesting model thread is not scheduled 224, the thread dispatcher 164 repeatedly queries the thread scheduler 166 to determine if there is an update to the currently scheduled model thread (which may be the existing model thread that is currently scheduled or another, new model thread that is scheduled after the existing model thread completes its operation)

Once the requesting thread is scheduled 224 and the resources to execute the thread are retrieved 226, the thread operation is executed 228. Once the operation is complete, the thread dispatcher 168 notifies 230 the thread scheduler 162 and requests 232 scheduling of the next model thread. The scheduling strategy 170 is advanced 234. That is, the thread context is switched to the new thread context. As described further with reference to FIG. 3, the thread context is switched to the new thread context based on the order of threads scheduled using the thread scheduling strategy 170 and the sequence of random numbers generated by the pseudorandom number generator. As described further with reference to FIG. 3, using a pseudorandom number generator in conjunction with the thread scheduling algorithm allows for a given model thread execution sequence to be consistently reproducible.

The results of the thread execution are returned to the back-end 164 (e.g., C++ back-end). The results are dependent on the specific operation executed by the model thread. In some examples, the result may be a value of a register in the CPU model, the number of times a specific exception has occurred or the generation of a load instruction.

FIG. 3 is a flow diagram of an example process 300 for pseudorandom thread generation 300. Operations of process 300 are described below as being performed by the components of the system described and depicted in FIG. 1. It should be understood that the operations of FIG. 3, as well as FIG. 2, illustrates various details of the methods associated with the system of FIG. 1 and such details in FIGS. 2 and 3 may readily be intermingled in the embodiment of the disclosure. Operations of the process 300 are described below for illustration purposes only. Operations of the process 300 can be performed by any appropriate device or system, e.g., any appropriate data processing apparatus. Operations of the process 300 can also be implemented as instructions stored on a non-transitory computer readable medium. Execution of the instructions causes one or more data processing apparatus to perform operations of the process 300.

Pseudorandom thread generation comprises obtaining 302, by a CPU verification tool (such as instruction sequence generator 160), a central processing unit (CPU) model. The CPU model includes a plurality of model threads that correspond to the plurality of software execution threads of the CPU. In an implementation, the model enables testing of the states and functional correctness of a CPU design. In an implementation, the CPU model can be written in a hardware design language such as VHDL, HDL, or Verilog. For an instruction sequence generator (ISG) 160 to be useful in verifying a CPU design, the ISG 160 models distinct threads of execution and generates instructions for each of those model threads.

The model includes tracking state information for each of the plurality of model threads. That is, the ISG 160 maintains software objects corresponding to the CPU architecture, such as register names, widths and values and memory addresses and values. In some implementations, a co-simulation library can be built on top of an instruction set simulator (e.g., ISG 160) to execute generated instructions and update the state according to the results of instruction execution.

One or more seed values are input 304 into a pseudorandom number generator, for example, pseudorandom number generator 175 shown in FIG. 1 above. In some implementations, the user input 118 received from the client device 102 can include one or more seed values. The user can determine a seed value to select from among a plurality of seed values. In an example, the plurality of seed values include the data, the time, and a user-specified seed value e.g. any appropriate number selected by the user.

In some implementations, the CPU verification tool 150 parses the one or more seed values from the received user input 118, and provides the one or more seed values as input to the pseudorandom number generator 175. Using the input seed value(s), the pseudorandom number generator 175 generates a sequence of pseudorandom numbers 146, which can be stored (e.g., in memory 144).

The thread scheduler 166 uses the sequence of pseudorandom values and a thread scheduling algorithm to generate 306 a thread execution order of the plurality of model threads. In some implementations, the thread scheduler 166 selects the thread scheduling algorithm from among multiple thread scheduling algorithms. For example, the thread scheduler 166 can select a thread scheduling algorithm that has been previously specified by the user or select a predefined default scheduling algorithm as the thread scheduling algorithm. In some implementations, the scheduling algorithm is interchangeable, allowing testing of different thread scheduling scenarios.

Examples of thread scheduling algorithms include shuffled round-robin algorithm, a weighted random selection algorithm, a random starvation scheduling algorithm, and a priority scheduling algorithm. Each of these example scheduling algorithms is briefly described below.

The random starvation scheduling algorithm chooses an initial random order for the model threads to execute, it then proceeds to execute the model threads in that order, starting again with the first model thread after the last model thread has executed. At each model thread's turn to execute a pseudorandom number is compared against a threshold. If the number exceeds the threshold, the model thread is selected for starvation and is skipped for a constrained random number of cycles.

The priority scheduling algorithms assign a priority to each model thread. The priority values can be explicitly specified by the user or randomly selected. The model thread with the highest priority is always scheduled. If there are multiple model threads with the highest priority value, one is selected at random.

The shuffled round robin scheduling algorithm schedules threads so that for each scheduling round, every model thread is permitted one chance to execute. The order of the model threads is randomly determined at the beginning of each round based on the sequence of pseudorandom numbers generated by the pseudorandom number generator. That is, the model thread order is reproducible with a known seed value input to the pseudorandom number generator.

Weighted random selection scheduling algorithms schedule model threads such that the next model thread to execute is randomly chosen using different probability weights associated with each model thread. This approach favors certain model threads with higher probability weights executing over those with lower probability weights.

As described above, the thread scheduler 166 uses the sequence of pseudorandom values and a thread scheduling algorithm to generate 306 a thread execution order of the plurality of model threads. This thread execution order is randomly determined at the beginning of each round based on the sequence of pseudorandom numbers generated by the pseudorandom number generator. The thread scheduler 166 uses a deterministic function that accepts, as input, a list of model thread IDs and one or more pseudorandom values, and outputs a list of model thread IDs. By repeating this process (e.g., by providing the same input to the deterministic function) results in generating the same output list of model thread IDs. This is illustrated using the following example.

In an example, the deterministic function used by the thread scheduler accepts a list of model thread IDs and a list of pseudorandom values equal in length to the list of model thread IDs. In one example implementation the deterministic function can comprise the following sequence: 1) accept a list of model thread IDs and a list of pseudorandom values equal in length to the list of model thread IDs, 2) begin with index equal to the last index in the list of model thread IDs, 3) while index is greater than 0 a) calculate the modulus with respect to index of the indexth pseudorandom value, i.e. pseudorandom_values[index] % index b) swap the indexth model thread ID with the thread ID at the index represented by the calculated modulus, i.e. swap(thread_ids[index], thread_ids[modulus] d) decrement index. In an example the implementation can be from the standard C++ library.

In another example, the same number of pseudorandom values as model thread IDs can be used (e.g., four pseudorandom values for four model thread IDs). In this example, the pseudorandom values can be mapped to the model thread IDs and then the pseudorandom values can be sorted, e.g., in ascending order, to yield a corresponding list of model thread IDs (that represents the thread execution order). For example, assuming four model thread IDs 1, 2, 3, 4 and four pseudorandom values 25, 12, 87, 16, the pseudorandom values can be mapped to the model thread IDs according to list placement, e.g. 25→1, 12→2, 87→3, and 16→4. Sorting pseudorandom values in ascending order results in obtaining 12, 16, 25, 87, which in turn indicates a model thread ID output sequence of 2, 4, 1, 3. Re-running the same process with the same number of threads and the same seed value (which yields the same sequence of pseudorandom numbers) results in outputting the same model thread ID sequence.

In this manner, by using a pseudorandom number generator in conjunction with the thread scheduling algorithm, a given model thread execution sequence is consistently reproducible during generation with the specification of a specific seed value for the pseudorandom number generator.

The following paragraphs provide additional embodiments for implementing the thread scheduling during instruction sequence generation, as described previously with reference to FIGS. 1-3.

In one embodiment, a computer-implemented method is provided for scheduling threads. The method can include at least the following steps: obtaining a model of a central processing unit (CPU) that includes a plurality of threads, wherein the model includes a plurality of model threads that correspond to the plurality of threads of the CPU; inputting, into a pseudorandom number generator, a seed value; obtaining, from the pseudorandom number generator and in response to the input seed value, a sequence of pseudorandom values; and generating, using the sequence of pseudorandom values and a thread scheduling algorithm, a thread execution order of the plurality of model threads.

The computer implemented method can further include determining when a currently executing model thread of the plurality of model threads will finish executing and a next model thread will begin executing; and advancing to the next model thread when the currently executing model thread finishes executing.

In some embodiments, obtaining the model includes tracking state information for each of the plurality of model threads.

The computer-implemented method can further include spawning a separate software execution thread for each of the one or more model threads; and maintaining a mapping of software execution threads to each of the one or more model threads using a map data structure.

The computer-implemented method can further include obtaining a list of thread identifiers (IDs) of the plurality of software execution threads.

The computer-implemented method can further include obtaining a thread ID of the software execution thread currently executing; and obtaining, using the thread ID of the software execution thread and the mapping, the model thread corresponding to the software execution thread.

The computer-implemented method can further include retrieving a state and resources assigned to model thread for executing a model thread in response to a scheduled model thread operation.

In some implementations, the computer-implemented method can further include requesting for the software execution thread currently executing to continue execution; retrieving, from the map data structure, the model thread corresponding to the software execution thread currently executing; determining whether the model thread is a currently scheduled thread; and controlling execution of the model thread based on whether the model thread is the currently scheduled thread.

The computer-implemented method can further include selecting the instruction scheduling algorithm from among a plurality of instruction scheduling algorithms, wherein the plurality of instruction scheduling algorithms include at least a shuffled round-robin algorithm, a weighted random selection algorithm, a random starvation scheduling algorithm, and a priority scheduling algorithm.

The computer-implemented method can further include selecting the seed value from among a plurality of seed values, wherein the plurality of seed values include the data, the time, and a user-specified seed value.

For one embodiment for implementing the thread scheduling during instruction sequence generation, one or more non-transitory computer-readable media are provided that are coupled to one or more processors and have instructions stored thereon which, when executed by the one or more processors, cause the one or more processors to perform at least the following operations comprising: obtaining a model of a central processing unit (CPU) that includes a plurality of threads, wherein the model includes a plurality of model threads that correspond to the plurality of threads of the CPU; inputting, into a pseudorandom number generator, a seed value; obtaining, from the pseudorandom number generator and in response to the input seed value, a sequence of pseudorandom values; and generating, using the sequence of pseudorandom values and a thread scheduling algorithm, a thread execution order of the plurality of model threads.

The non-transitory computer-readable media can be provided with instructions, that when executed by the one or more processors, cause the one or more processors to perform at least the following further additional operations: determining when a currently executing model thread of the plurality of model threads will finish executing and a next model thread will begin executing; and advancing to the next model thread when the currently executing model thread finishes executing.

The non-transitory computer-readable media can be provided with instructions, that when executed by the one or more processors, cause the one or more processors to perform at least the following further additional operations: spawning a separate software execution thread for each of the one or more model threads; and maintaining a mapping of software execution threads to each of the one or more model threads using a map data structure.

The non-transitory computer-readable media can be provided with instructions, that when executed by the one or more processors, cause the one or more processors to perform at least the following further additional operations: selecting the instruction scheduling algorithm from among a plurality of instruction scheduling algorithms, wherein the plurality of instruction scheduling algorithms include at least shuffled round-robin algorithm, a weighted random selection algorithm, a random starvation scheduling algorithm, and a priority scheduling algorithm.

In another embodiment for implementing the thread scheduling during instruction sequence generation, a system is provided that includes one or more processors and a non-transitory computer-readable media device coupled to the one or more processors and having instructions stored thereon which, when executed by the one or more processors, cause the one or more processors to perform at least the following operations: obtaining a model of a central processing unit (CPU) that includes a plurality of threads, wherein the model includes a plurality of model threads that correspond to the plurality of threads of the CPU; inputting, into a pseudorandom number generator, a seed value; obtaining, from the pseudorandom number generator and in response to the input seed value, a sequence of pseudorandom values; and generating, using the sequence of pseudorandom values and a thread scheduling algorithm, a thread execution order of the plurality of model threads.

The system's non-transitory computer-readable media can be provided with instructions, that when executed by the one or more processors, cause the one or more processors to perform at least the following additional operations: determining when a currently executing model thread of the plurality of model threads will finish executing and a next model thread will begin executing; and advancing to the next model thread when the currently executing model thread finishes executing.

The system's non-transitory computer-readable media can be provided with instructions, that when executed by the one or more processors, cause the one or more processors to perform at least the following additional operation: tracking state information for each of the plurality of model threads.

The system's non-transitory computer-readable media can be provided with instructions, that when executed by the one or more processors, cause the one or more processors to perform at least the following additional operations: spawning a separate software execution thread for each of the one or more model threads; and maintaining a mapping of software execution threads to each of the one or more model threads using a map data structure.

The system's non-transitory computer-readable media can be provided with instructions, that when executed by the one or more processors, cause the one or more processors to perform at least the following additional operation: retrieving a state and resources assigned to model thread for executing a model thread in response to a scheduled model thread operation.

The system's non-transitory computer-readable media can be provided with instructions, that when executed by the one or more processors, cause the one or more processors to perform at least the following additional operations: requesting for the software execution thread currently executing to continue execution; retrieving, from the map data structure, the model thread corresponding to the software execution thread currently executing; determining whether the model thread is a currently scheduled thread; and controlling execution of the model thread based on whether the model thread is the currently scheduled thread.

Figure 4:
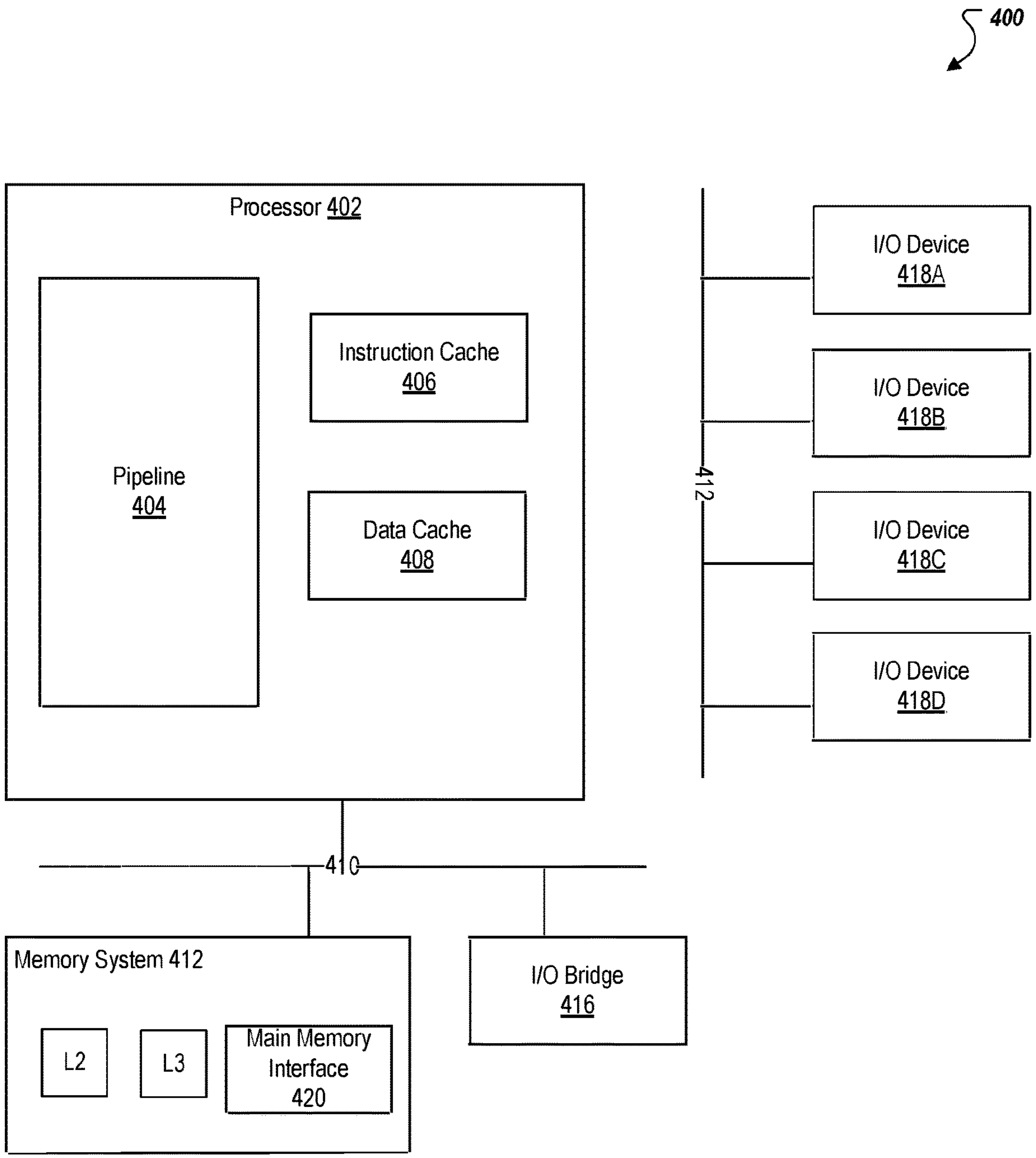
FIG. 4 is a schematic of an example microprocessor based computing device on which a CPU verification tool can be implemented.

FIG. 4 shows an example of a computing system that contains a microprocessor. The techniques described in this specification can be implemented to run on the computing system to verify the functional correctness of the same or another microprocessor design. The computing system 400 includes at least one processor 402, which could be a single central processing unit (CPU) or an arrangement of multiple processor cores of a multi-core architecture.

In the depicted example, the processor 402 includes a pipeline 404, an instruction cache 406, and a data cache 408 (and other circuitry, not shown). The processor 402 is connected to a processor bus 410, which enables communication with an external memory system 412 and an input/output (I/O) bridge 414. The I/O bridge 414 enables communication over an I/O bus 416, with various different I/O devices 418A-418D (e.g., disk controller, network interface, display adapter, and/or user input devices such as a keyboard or mouse).

The external memory system 412 is part of a hierarchical memory system that includes multi-level caches, including the first level (L1) instruction cache 406 and data cache 408, and any number of higher level (L2, L3, etc.) caches within the external memory system 412. Other circuitry (not shown) in the processor 402 supporting the caches 406 and 408 includes a translation lookaside buffer (TLB), various other circuitry for handling a miss in the TLB or the caches 406 and 408. For example, the TLB is used to translate an address of an instruction being fetched or data being referenced from a virtual address to a physical address, and to determine whether a copy of that address is in the instruction cache 406 or data cache 408, respectively. If so, that instruction or data can be obtained from the L1 cache. If not, that miss is handled by miss circuitry so that it may be executed from the external memory system 412. It is appreciated that the division between which level caches are within the processor 402 and which are in the external memory system 412 can differ in various examples. For example, an L1 cache and an L2 cache may both be internal and an L3 (and higher) cache could be external. The external memory system 412 also includes a main memory interface 420, which is connected to any number of memory modules (not shown) serving as main memory (e.g., Dynamic Random Access Memory modules).

Figure 5:
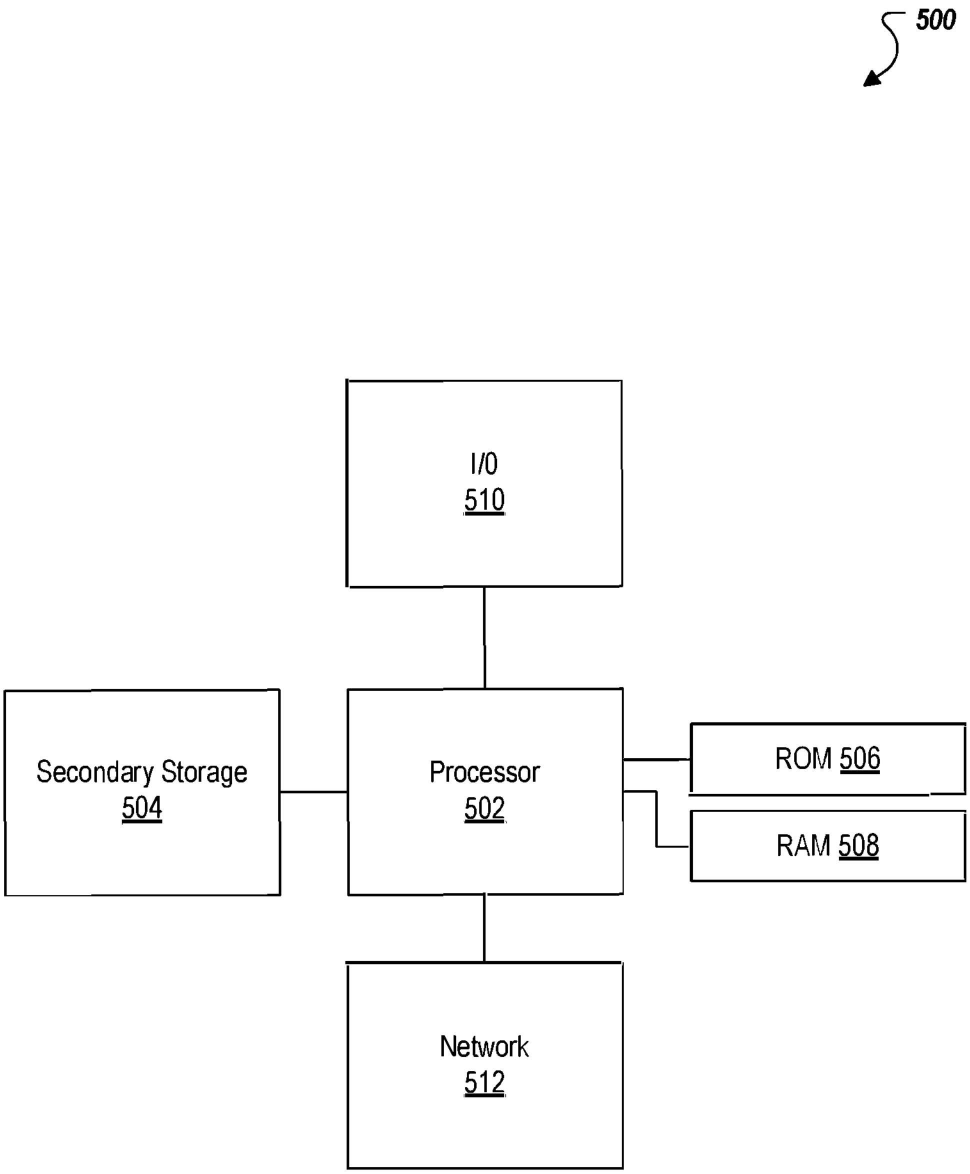
FIG. 5 is a schematic of a general purpose network component or computer system.

FIG. 5 illustrates a schematic diagram of a general-purpose network component or computer system. The general-purpose network component or computer system 500 includes a processor 502 (which may be referred to as a central processor unit or CPU) that is in communication with memory devices including secondary storage 504, and memory, such as ROM 506 and RAM 508, input/output (I/O) devices 510, and a network 512, such as the Internet or any other well-known type of network, that may include network connectivity devices, such as a network interface. Although illustrated as a single processor, the processor 502 is not so limited and may comprise multiple processors. The processor 502 may be implemented as one or more CPU chips, cores (e.g., a multi-core processor), FPGAs, ASICs, and/or DSPs, and/or may be part of one or more ASICs. The processor 502 may be configured to implement any of the schemes described herein. The processor 502 may be implemented using hardware, software, or both.

The secondary storage 504 is typically comprised of one or more disk drives or tape drives and is used for non-volatile storage of data and as an over-flow data storage device if the RAM 708 is not large enough to hold all working data. The secondary storage 504 may be used to store programs that are loaded into the RAM 508 when such programs are selected for execution. The ROM 506 is used to store instructions and perhaps data that are read during program execution. The ROM 506 is a non-volatile memory device that typically has a small memory capacity relative to the larger memory capacity of the secondary storage 504. The RAM 508 is used to store volatile data and perhaps to store instructions. Access to both the ROM 506 and the RAM 508 is typically faster than to the secondary storage 504. At least one of the secondary storage 504 or RAM 508 may be configured to store routing tables, forwarding tables, or other tables or information disclosed herein.

It is understood that by programming and/or loading executable instructions onto the node 500, at least one of the processor 502 or the memory (e.g. ROM 506, RAM 508) are changed, transforming the node 500 in part into a particular machine or apparatus, e.g., a router, having the novel functionality taught by the present disclosure. Similarly, it is understood that by programming and/or loading executable instructions onto the node 500, at least one of the processor 502, the ROM 506, and the RAM 508 are changed, transforming the node 500 in part into a particular machine or apparatus, e.g., a router, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The technology described herein can be implemented using hardware, firmware, software, or a combination of these. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of scheduling threads for instruction sequence generation comprising:

obtaining a model of a central processing unit (CPU) that includes a plurality of threads, wherein the model includes a plurality of model threads that correspond to the plurality of threads of the CPU, and wherein the model of the CPU is coded in a hardware description language;

inputting, into a pseudorandom number generator, a seed value;

obtaining, from the pseudorandom number generator and in response to the seed value, a sequence of pseudorandom values;

generating, using the sequence of pseudorandom values and a deterministic thread scheduling algorithm, a thread execution order of the plurality of model threads;

detecting an error in CPU simulation testing of the plurality of model threads;

in response to the detecting:

inputting, into the pseudorandom number generator, the seed value;

obtaining, from the pseudorandom number generator and in response to the seed value, a second sequence of pseudorandom values, the second sequence of pseudorandom values being the same as the sequence of pseudorandom values based on the seed value;

generating, using the sequence of pseudorandom values and the deterministic thread scheduling algorithm, a second thread execution order of the plurality of model threads, the second thread execution order of the plurality of model threads being the same as the thread execution order of the plurality of model threads based on the second sequence of pseudorandom values being the same as the sequence of pseudorandom values, wherein the deterministic thread scheduling algorithm receives a list of model thread IDs and the sequence of pseudorandom values as inputs and outputs the thread execution order, and wherein CPU design is modified to resolve the error after the generating the second thread execution order; and verifying resolution of the error in the modified CPU design using the seed value to generate a third thread execution order of the plurality of model threads, the third thread execution order of the plurality of model threads being the same as the thread execution order of the plurality of model threads.

2. The computer-implemented method of claim 1, further comprising:

determining when a currently executing model thread of the plurality of model threads will finish executing and a next model thread will begin executing; and advancing to the next model thread when the currently executing model thread finishes executing.

3. The computer-implemented method of claim 1, wherein obtaining the model includes tracking state information for each of the plurality of model threads.

4. The computer-implemented method of claim 1, further comprising:

spawning a separate software execution thread for each of the plurality of model threads; and maintaining a mapping of software execution threads to each of the plurality of model threads using a map data structure.

5. The computer-implemented method of claim 4, further comprising obtaining a list of thread identifiers (IDs) of the software execution threads.

6. The computer-implemented method of claim 5, further comprising:

obtaining a thread ID of a software execution thread currently executing; and obtaining, using the thread ID of the software execution thread and the mapping, a model thread corresponding to the software execution thread.

7. The computer-implemented method of claim 1, further comprising:

retrieving a state and resources assigned to model thread for executing the model thread in response to a scheduled model thread operation.

8. The computer-implemented method of claim 4, further comprising:

requesting for a software execution thread currently executing to continue execution;

retrieving, from the map data structure, a model thread corresponding to the software execution thread currently executing;

determining whether the model thread is a currently scheduled thread; and controlling execution of the model thread based on whether the model thread is the currently scheduled thread.

9. The computer-implemented method of claim 1, further comprising:

selecting an instruction scheduling algorithm from among a plurality of instruction scheduling algorithms, wherein the plurality of instruction scheduling algorithms include at least a shuffled round-robin algorithm, a weighted random selection algorithm, a random starvation scheduling algorithm, and a priority scheduling algorithm.

10. The computer-implemented method of claim 1, further comprising:

selecting the seed value from among a plurality of seed values, wherein the plurality of seed values include data, time, and a user-specified seed value.

11. A non-transitory computer-readable medium having instructions stored thereon which, when executed by one or more processors, cause the one or more processors to perform operations comprising:

obtaining a model of a central processing unit (CPU) that includes a plurality of threads, wherein the model includes a plurality of model threads that correspond to the plurality of threads of the CPU, and wherein the model of the CPU is coded in a hardware description language;

inputting, into a pseudorandom number generator, a seed value;

obtaining, from the pseudorandom number generator and in response to the seed value, a sequence of pseudorandom values;

generating, using the sequence of pseudorandom values and a deterministic thread scheduling algorithm, a thread execution order of the plurality of model threads;

detecting an error in CPU simulation testing of the plurality of model threads;

in response to the detecting:

inputting, into the pseudorandom number generator, the seed value;

obtaining, from the pseudorandom number generator and in response to the seed value, a second sequence of pseudorandom values, the second sequence of pseudorandom values being the same as the sequence of pseudorandom values based on the seed value;

generating, using the sequence of pseudorandom values and the deterministic thread scheduling algorithm, a second thread execution order of the plurality of model threads, the second thread execution order of the plurality of model threads being the same as the thread execution order of the plurality of model threads based on the second sequence of pseudorandom values being the same as the sequence of pseudorandom values, wherein the deterministic thread scheduling algorithm receives a list of model thread IDs and the sequence of pseudorandom values as inputs and outputs the thread execution order, and wherein CPU design is modified to resolve the error after the generating the second thread execution order; and verifying resolution of the error in the modified CPU design using the seed value to generate a third thread execution order of the plurality of model threads, the third thread execution order of the plurality of model threads being the same as the thread execution order of the plurality of model threads.

12. The non-transitory computer-readable medium of claim 11, the operations further comprising:

determining when a currently executing model thread of the plurality of model threads will finish executing and a next model thread will begin executing; and advancing to the next model thread when the currently executing model thread finishes executing.

13. The non-transitory computer-readable medium of claim 11, the operations further comprising:

spawning a separate software execution thread for each of the plurality of model threads; and maintaining a mapping of software execution threads to each of the plurality of model threads using a map data structure.

14. The non-transitory computer-readable medium of claim 11, the operations further comprising:

selecting an instruction scheduling algorithm from among a plurality of instruction scheduling algorithms, wherein the plurality of instruction scheduling algorithms include at least a shuffled round-robin algorithm, a weighted random selection algorithm, a random starvation scheduling algorithm, and a priority scheduling algorithm.

15. A system, comprising:

one or more processors; and a non-transitory computer-readable medium device coupled to the one or more processors and having instructions stored thereon which, when executed by the one or more processors, cause the one or more processors to perform operations comprising:

obtaining a model of a central processing unit (CPU) that includes a plurality of threads, wherein the model includes a plurality of model threads that correspond to the plurality of threads of the CPU, and wherein the model of the CPU is coded in a hardware description language;

inputting, into a pseudorandom number generator, a seed value;

obtaining, from the pseudorandom number generator and in response to the seed value, a sequence of pseudorandom values; and generating, using the sequence of pseudorandom values and a deterministic thread scheduling algorithm, a thread execution order of the plurality of model threads;

detecting an error in CPU simulation testing of the plurality of model threads;

in response to the detecting:

inputting, into the pseudorandom number generator, the seed value;

obtaining, from the pseudorandom number generator and in response to the seed value, a second sequence of pseudorandom values, the second sequence of pseudorandom values being the same as the sequence of pseudorandom values based on the seed value;

generating, using the sequence of pseudorandom values and the deterministic thread scheduling algorithm, a second thread execution order of the plurality of model threads, the second thread execution order of the plurality of model threads being the same as the thread execution order of the plurality of model threads based on the second sequence of pseudorandom values being the same as the sequence of pseudorandom values, wherein the deterministic thread scheduling algorithm receives a list of model thread IDs and the sequence of pseudorandom values as inputs and outputs the thread execution order, and wherein CPU design is modified to resolve the error after the generating the second thread execution order; and verifying resolution of the error in the modified CPU design using the seed value to generate a third thread execution order of the plurality of model threads, the third thread execution order of the plurality of model threads being the same as the thread execution order of the plurality of model threads.

16. The system of claim 15, the operations further comprising:

determining when a currently executing model thread of the plurality of model threads will finish executing and a next model thread will begin executing; and advancing to the next model thread when the currently executing model thread finishes executing.

17. The system of claim 15, wherein obtaining the model includes tracking state information for each of the plurality of model threads.

18. The system of claim 15, the operations further comprising:

spawning a separate software execution thread for each of the plurality of model threads; and maintaining a mapping of software execution threads to each of the plurality of model threads using a map data structure.

19. The system of claim 15, the operations further comprising:

retrieving a state and resources assigned to a model thread for executing the model thread in response to a scheduled model thread operation.

20. The system of claim 18, the operations further comprising:

requesting for a software execution thread currently executing to continue execution;

retrieving, from the map data structure, a model thread corresponding to the software execution thread currently executing;

determining whether the model thread is a currently scheduled thread; and controlling execution of the model thread based on whether the model thread is the currently scheduled thread.

21. The method of claim 1, wherein the modified CPU design is implemented in a hardware CPU.

* * * * *